United States Patent
Kim et al.

(10) Patent No.: US 11,133,115 B2
(45) Date of Patent: Sep. 28, 2021

(54) NUCLEAR FUEL ROD INCLUDING DISK-TYPE BURNABLE ABSORBER

(71) Applicant: Korea Advanced Institute of Science and Technology, Daejeon (KR)

(72) Inventors: Yonghee Kim, Daejeon (KR); Seongdong Jang, Daejeon (KR); Xuan Ha Nguyen, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/797,309

(22) Filed: Feb. 21, 2020

(65) Prior Publication Data
US 2021/0125736 A1  Apr. 29, 2021

(30) Foreign Application Priority Data
Oct. 29, 2019  (KR) .................. 10-2019-0135740

(51) Int. Cl.
| G21C 7/04 | (2006.01) |
| G21C 21/02 | (2006.01) |
| G21C 3/04 | (2006.01) |
| G21C 3/18 | (2006.01) |

(52) U.S. Cl.
CPC ............ *G21C 7/04* (2013.01); *G21C 21/02* (2013.01); *G21C 3/045* (2019.01); *G21C 3/18* (2013.01)

(58) Field of Classification Search
CPC .......... G21C 7/04; G21C 21/02; G21C 3/326; G21C 3/045

USPC ......................................................... 376/419
See application file for complete search history.

(56) References Cited

U.S. PATENT DOCUMENTS

| 2,984,613 | A | | 5/1961 | Bassett |
| 3,759,786 | A | | 9/1973 | Abate-Daga |
| 4,587,087 | A | * | 5/1986 | Radford ................ G21C 3/20 |
| | | | | 376/419 |
| 4,671,927 | A | | 6/1987 | Alsop |
| 4,678,629 | A | | 7/1987 | Popa |
| 5,009,840 | A | | 4/1991 | Ueda et al. |
| 5,075,075 | A | | 12/1991 | Kapil |
| 5,309,493 | A | | 5/1994 | Kamimura |

(Continued)

FOREIGN PATENT DOCUMENTS

| JP | 601591 A | | 1/1985 |
| JP | H01232289 A | * | 9/1989 |

(Continued)

OTHER PUBLICATIONS

Korean Patent Application No. 10-2019-0135740, Notice of Preliminary Rejection dated Feb. 27, 2020, 7 pages.

(Continued)

*Primary Examiner* — Jack W Keith
*Assistant Examiner* — Daniel Wasil
(74) *Attorney, Agent, or Firm* — Fredrikson & Byron, P.A.

(57) ABSTRACT

Disclosed is a nuclear fuel rod including at least one or more fuel pellets, a cladding tube surrounding the fuel pellets, and burnable absorber inside the cladding tube. The burnable absorber comprises a burnable absorber material and a cladding material surrounding the burnable absorber material. The burnable absorber has a disk shape, and the cladding material is an alloy comprising zirconium.

8 Claims, 8 Drawing Sheets

(56) References Cited

U.S. PATENT DOCUMENTS

| | | | | |
|---|---|---|---|---|
| 5,872,826 | A | * | 2/1999 | Fujieda .................... G21C 7/04 |
| | | | | 376/419 |
| 7,815,964 | B2 | * | 10/2010 | Lahoda .................... G21C 7/04 |
| | | | | 376/419 |
| 9,042,507 | B2 | | 5/2015 | Doerr |
| 2018/0151261 | A1 | * | 5/2018 | Yonghee ................. G21C 7/04 |
| 2018/0330832 | A1 | * | 11/2018 | Enica ...................... G21C 3/04 |
| 2020/0321134 | A1 | * | 10/2020 | O'Brien ................... G21C 7/04 |

FOREIGN PATENT DOCUMENTS

| | | | |
|---|---|---|---|
| JP | 4212093 A | | 8/1992 |
| JP | H0540186 A | * | 2/1993 |
| JP | 9304566 A | | 11/1997 |
| KR | 1019990085212 A | | 12/1999 |
| KR | 1020010001112 A | | 1/2001 |
| KR | 1020090037633 A | | 4/2009 |
| KR | 1020110070984 A | | 2/2016 |

OTHER PUBLICATIONS

English Translation of Notice of Preliminary Rejection dated Feb. 27, 2020, for Korean Patent Application No. 10-2019-0135740, 5 pages.
Korean Patent Application No. 10-2019-0135740, Notice of Allowance dated May 12, 2020, 5 pages.
English Translation of Notice of Allowance dated May 12, 2020, for Korean Patent Application No. 10-2019-0135740, 1 page.
Extended European Search Report dated Sep. 4, 2020 for related European patent application No. 20159606.1, 8 pages.

\* cited by examiner

[Figure 1]
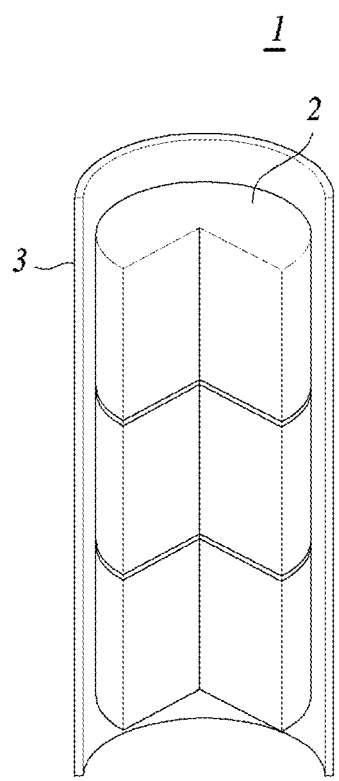

[Figure 2]
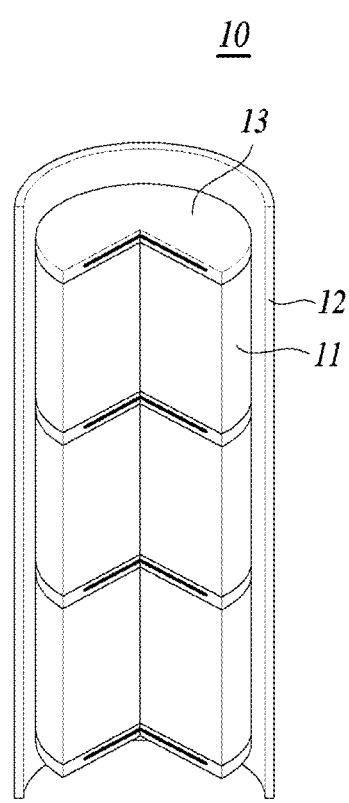

[Figure 3]
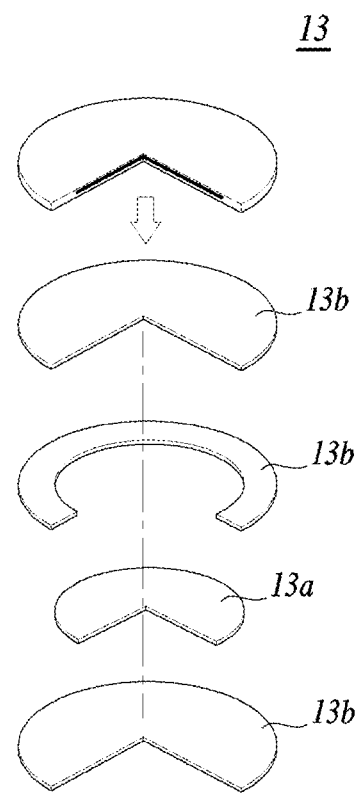

[Figure 4]
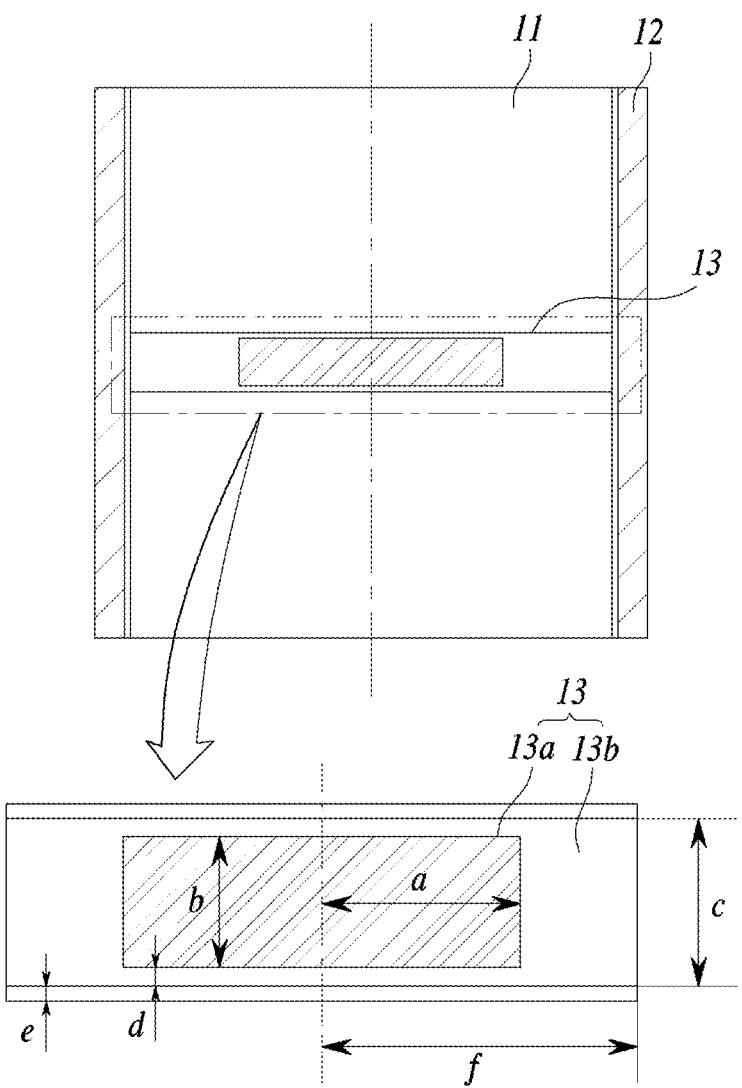

【Figure 5】
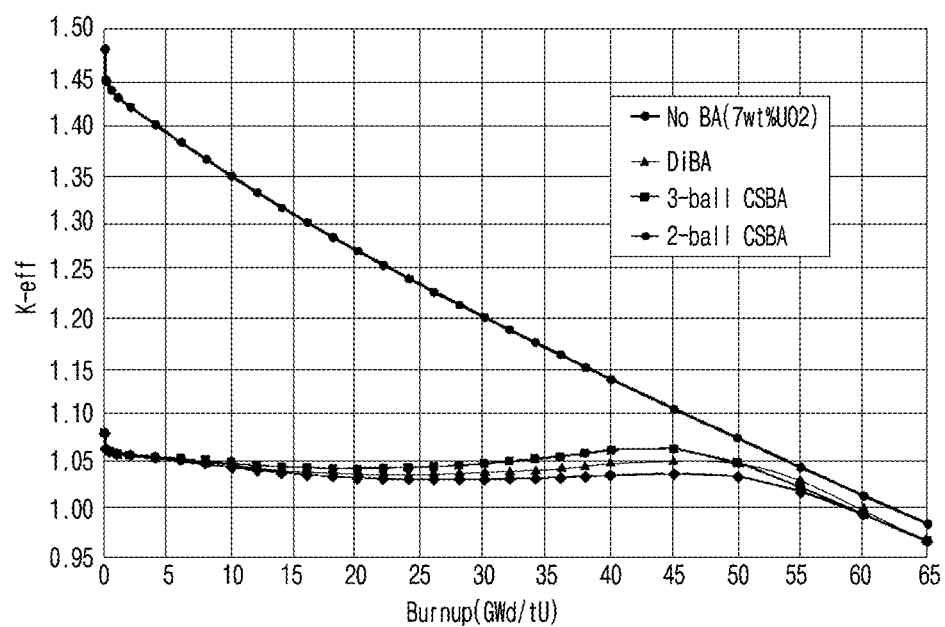

【Figure 6】
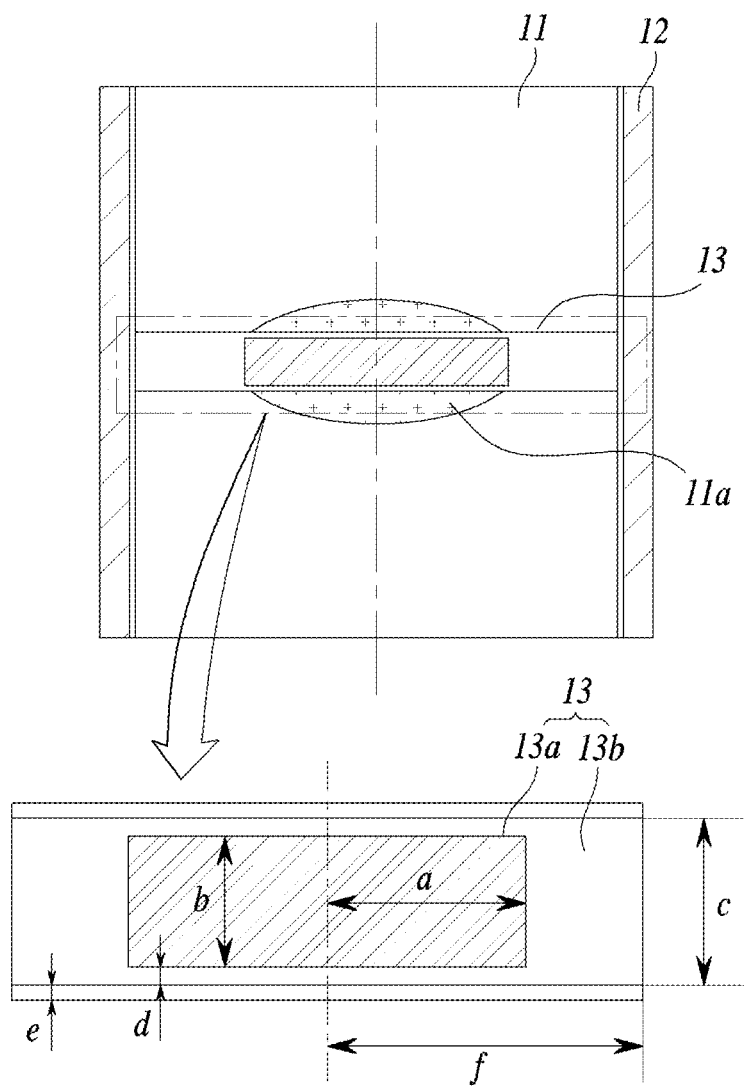

[Figure 7]
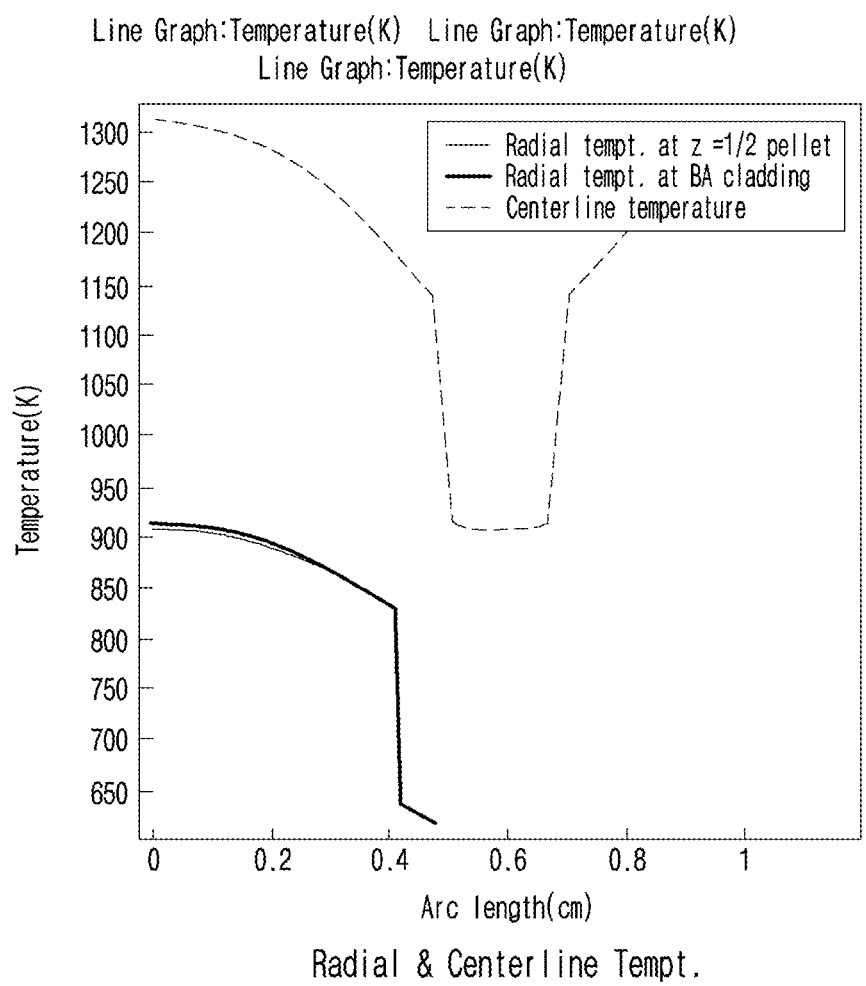
Radial & Centerline Tempt.

[Figure 8]
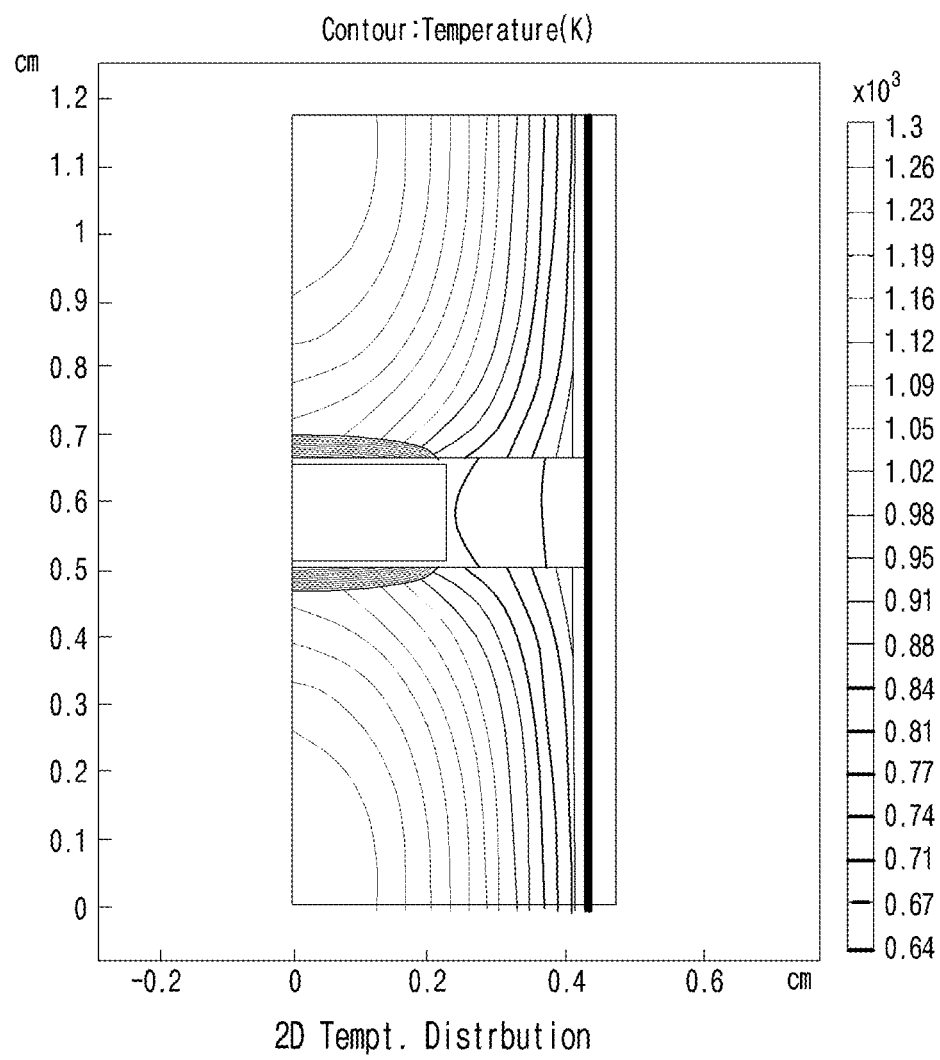

NUCLEAR FUEL ROD INCLUDING DISK-TYPE BURNABLE ABSORBER

CROSS-REFERENCES TO RELATED APPLICATION

This patent application claims the benefit of priority under 35 U.S.C. § 119 from Korean Patent Application No. 10-2019-0135740 filed on Oct. 29, 2019, the contents of which are incorporated herein by reference.

BACKGROUND OF THE INVENTION

1. Field of the Invention

The present invention relates to a nuclear fuel rod including a burnable absorber.

2. Description of the Related Art

Nuclear power plants refer to power plants in which electricity is produced from nuclear energy released from a nuclear reaction. Commercial nuclear power plants based on a nuclear fission chain reaction are classified, according to methods for slowing down neutrons and the neutron energy thereby, into pressurized water reactors (PWRs), pressurized heavy water reactors (PHWRs), boiling water reactors (BWRs), and fast reactors (FRs). The basic principle of a nuclear fission chain reaction is repetitive process that a fissile material such as uranium 235 (U-235) absorbs a single neutron and then emits approximately 2.5 neutrons which cause other fission reactions with other fissile materials. A fission reaction releases energy in form of kinetic energy of the neutrons and fission products, gamma rays, etc.

Inside a nuclear reactor in a nuclear power plant, the numbers of neutrons released from nuclear fissions are artificially adjusted to control nuclear fission chain reactions as desired. If the amount of neutrons generated by the nuclear fission reactions is more than, less than, or equal to the amount of lost neutrons, these states are respectively defined as "supercritical", "subcritical", or "critical" state. The physical numerical value that indicates the extent of such nuclear fission chain reaction is referred to as "reactivity". When the reactivity is positive, the reactor is in a "supercritical" state, when the reactivity is negative, the reactor is in a "subcritical" state, and when the reactivity is zero, the reactor is in a "critical" state, respectively.

In a general light water reactor (LWR), a uranium-based fissile material in which a certain portion of uranium 235 is enriched is processed into a pellet form, and is charged into a nuclear reactor in a form of a bundle of nuclear fuel assemblies (FAs). Nuclear reactors are each operated for the design life thereof in a manner in which for every constant fuel cycle, a portion of burned nuclear FAs is extracted and new nuclear FAs are charged. When a nuclear reactor is operated without any reactivity control at the beginning of cycle (BOC) after a new nuclear fuel is charged, the nuclear reactor assumes a "supercritical" state, and the reactivity value at this point is defined as "excess reactivity". The "excess reactivity" is generally the highest at an early stage of the nuclear reactor fuel cycle, is gradually decreased as the nuclear fuel is burnt, and approaches a "critical" state at the end of cycle. In an actual operation of a nuclear reactor, it is desirable during the fuel cycle to adjust the "excess reactivity" and artificially maintain the reactor in "critical state".

In a general nuclear reactor, the excess reactivity is adjusted by mechanical insertion or extraction of a control rod composed of neutron-absorbing materials. However, when the excess reactivity is large, the mechanical movement of the control rod should be increased, so that not only the uncertainty of reactivity adjustment increases, but also the risk of accident may increase. Thus, in a general nuclear reactor, the excess reactivity is lowered using another method, and then an additional reactivity control is carried out using a control rod. One of well-known methods is a method of adding borated water to a coolant.

However, in this method, in order to neutralize the coolant's pH decreased by the borated water, LiOH is further added to the coolant. Consequently, not only a large amount of tritium is generated while LiOH and neutrons react, but also the moderator temperature coefficient (MTC), which is one of the inherent safety factors of a nuclear reactor, becomes less negative when the borated water is added to the coolant and may also be a positive value in a severe case. Thus, this method not only requires a complicated utility for controlling the concentration of the borated water but also deteriorates the inherent safety of the nuclear reactor, and the borated water itself has a property of corroding the structural materials of the nuclear reactor.

Thus, LWRs have been advanced in the direction of improving the inherent safety of the nuclear reactor, while aiming to enable an operation in a low-boron condition by introducing a concept of applying burnable absorber materials. The burnable absorber material converts into a material, which has very small neutron absorption probability after absorbing a neutron, and becomes incapable of functioning as a neutron absorber material as time elapses from the initial stage to the final stage of the nuclear reactor fuel cycle. The BA materials can be integrated with fuel in FAs. There are typical examples such as an integral fuel burnable absorber (IFBA) in which the outer portion of a fuel pellet is coated with a burnable absorber material, and a method in which a burnable absorber such as $Gd_2O_3$ or $Er_2O_3$ is used by being uniformly mixed with a nuclear fuel.

Most of these existing methods have obvious limitations in building a very-low-boron or a soluble-boron-free condition because of having low design flexibility and being optimized so as to be capable of only a low-boron operation in a general LWR environment. Therefore, recently, Korea advanced institute of science and technology (KAIST) has proposed a centrally-shielded burnable absorber (CSBA) in which design flexibility is guaranteed by locating a burnable absorber ($Gd_2O_3$) inside a fuel pellet, and in a physical aspect, the excess reactivity can efficiently be adjusted during cycle period of a nuclear reactor because the burnable absorber is very slowly burnt by using a self-shielding phenomenon. Compared to concepts of existing burnable absorbers in environments of existing LWRs, the merit, in which a fuel pellet charged with the CSBA remains inside a nuclear fuel and the excess reactivity can be effectively adjusted, has been verified through various research results. In addition, it was verified that the excess reactivity could be optimized even in a multi-batch reactor core design by inserting the CSBA into all of fuel pellets and using different numbers of CSBA. Also, in an aspect of manufacturability, it was verified that fuel pellets into which the CSBA was inserted could be manufactured, and even in various temperature environments, the integrity of the nuclear fuel was guaranteed. Consequently, it was confirmed through the existing research on the CSBA that the concept of burnable absorbers using the self-shielding phenomenon could build a very-low-boron or soluble-boron-free operation environment of a nuclear reactor by efficiently adjusting the excess reactivity, and thus, the inherent safety of the nuclear reactor could be maximized.

However, for all these merits, there are practical limitations, such as complicated management of nuclear FAs under a situation of using various numbers of CSBA, integrity of fuel pellets in which the CSBAs are inserted in a neutron irradiation environment, and applicability to an actual commercial nuclear reactor due to changes in existing nuclear pellet manufacturing methods. The present invention proposes a technology for applying a new burnable absorber which solve the aforementioned inherent limitations of existing burnable absorbers, and which are easily manufactured while having an excellent performance similar to the CSBA.

SUMMARY OF THE INVENTION

As described above, with regard to existing PWRs, technologies for various burnable absorbers adapted to the characteristics of the reactors have already been developed and the performance thereof have been sufficiently verified. However, in order to build a very-low-boron or a soluble-boron-free operation environment capable of remarkably improving the inherent safety and economy of the present commercial nuclear reactors and to satisfy the requirements for future-type long-fuel-cycle PWRs and small and medium sized or modular reactors (SMRs), various existing burnable absorbers exhibit obvious limitations thereof, and thus, new-concept burnable absorbers are demanded so as to match the required characteristics. The requirements for specific future-type nuclear reactors may be summarized as simpler and more economical burnable absorbers, implementation of very-low-boron or soluble-boron-free operations, economical and safe long-fuel cycle operations for 24 months, achievement of ultra-long operations by slightly increasing the degree of U-235 enrichment which is approximately 4-5% at present, and the like.

Thus, in an aspect of the present invention, there is provided a method of using a new burnable absorber, in which the excess reactivity of a nuclear reactor is effectively adjusted using a self-shielding phenomenon to minimize the disadvantages of existing burnable absorbers, and which may be applied to future-type LWRs and SMRs while improving the inherent safety and economic feasibility of commercial nuclear reactors.

According to an aspect of the present invention, there is provided a nuclear fuel rod including at least one or more fuel pellets and a cladding tube surrounding the fuel pellets, the nuclear fuel rod including a burnable absorber inside the cladding tube, and the burnable absorber including a burnable absorber material and a cladding material surrounding the burnable absorber material.

According to another aspect of the present invention, there is provided a nuclear fuel rod including at least one or more fuel pellets and a cladding tube surrounding the fuel pellets, the nuclear fuel rod having a structure in which the fuel pellets and disk-like burnable absorbers are alternately stacked, the burnable absorbers each including a disk-like burnable absorber material and a cladding material surrounding the burnable absorber material, and the fuel pellet having dishes on upper and lower portions thereof.

In addition, in another aspect of the present invention, there is provided a method for manufacturing a nuclear fuel rod, the method including: preparing at least one or more burnable absorbers each including a burnable absorber material and a cladding material surrounding the burnable absorber material; and alternately stacking, in a cladding tube, at least one or more fuel pellets and the at least one or more burnable absorbers.

Furthermore, there is provided a nuclear reactor including the nuclear fuel rod.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a conceptual view illustrating a nuclear fuel rod according to a related art;

FIG. 2 is a conceptual view illustrating a nuclear fuel rod according to an embodiment of the present invention;

FIG. 3 is a conceptual view illustrating a burnable absorber according to an embodiment of the present invention;

FIG. 4 is a plan view illustrating a nuclear fuel rod according to an embodiment of the present invention;

FIG. 5 is a graph comparing example 1 (DiBA), a control group (No BA (7 wt % $UO_2$)), comparative example 1 (3-ball CSBA), and comparative example 2 (2-ball CSBA);

FIG. 6 is a plan view illustrating a nuclear fuel rod according to an embodiment of the present invention;

FIG. 7 illustrates radial temperature distributions from central regions of a fuel pellet and a burnable absorber and FIG. 8 illustrates axial and radial-direction temperature distributions of a nuclear fuel rod including a burnable absorber.

DESCRIPTION OF THE PREFERRED EMBODIMENTS

Hereinafter, preferred embodiments of the present invention will be described in detail with reference to the accompanying drawings in such a manner that the technical idea of the present invention may easily be carried out by a person with ordinary skill in the art to which the invention pertains. The present disclosure may, however, be embodied in different forms and should not be construed as limited to the embodiments set forth herein. In the drawings, portions unnecessary for describing the present disclosure will be omitted for clarity, and like the reference numerals in the drawings denote like elements throughout the specification.

In this disclosure below, when one part (or element, device, etc.) is referred to as being 'connected' to another part (or element, device, etc.), it should be understood that the former can be 'directly connected' to the latter, or 'electrically connected to the latter via an intervening part (or element, device, etc.).

Throughout the specification of the present invention, when a member is "on" another member, this includes not only the case in which the member is in contact with another member, but also the case in which still another member is present between the two members.

Furthermore, when it is described that one comprises (or includes or has) some elements, it should be understood that it may comprise (or include or has) only those elements, or it may comprise (or include or have) other elements as well as those elements if there is no specific limitation. The terms "approximately", "substantially", and the like, which are used through the specification of the present invention, will be used as a meaning of being close to or adjacent to a numerical value when an allowable manufacturing or material error is provided to the described inherent meaning and to help understanding the present invention, and the terms are used to prevent an unscrupulous conscientious infringer from illegal use of a described content in which accurate or absolute numerical value is described. The terms "step of (performing) . . . " or "step of . . . " used in the entire specification of the present disclosure does not mean "step for".

Throughout the specification of the present invention, the term "combination thereof" included in a Markush type statement means a combination of one or more selected from the group consisting of elements described in the Markush type statement, and means that one or more selected from the group consisting of the elements are included.

In an aspect of the present invention, there is provided a nuclear fuel rod 10 including at least one or more fuel pellets 11 and a cladding tube 12 surrounding the fuel pellets, wherein the nuclear fuel rod 10 includes therein burnable absorbers 13, and the burnable absorbers 13 each include a burnable absorber material 13a and cladding materials 13b surrounding the burnable absorber material 13a.

Here, the nuclear fuel rod 10 provided in an aspect of the present invention is illustrated by schematic views in FIGS. 2 and 3, and hereinafter, with reference to the schematic views in FIGS. 2 and 3, the nuclear fuel rod 10 provided in an aspect of the present invention will be described in detail.

First, a self-shielding phenomenon inside the burnable absorber will be described below. A neutron infiltrating the burnable absorber material from the surface thereof firstly reacts with the burnable absorber material at the surface thereof, and converts the burnable absorber material into a material that does not absorb the neutron at the position. At this point, the number of neutrons decreases toward the inside of the burnable absorber material while the neutrons infiltrating from the surface gradually react with the burnable absorber material, and this is referred to as a self-shielding phenomenon. Due to such self-shielding phenomena, there is an effect of slowing down the burning of the entirety of the burnable absorber material while the probability of absorbing a neutron decreases inside the burnable absorber material. Consequently, an effect is provided in which the smaller the surface area of the burnable absorber having the same volume, the stronger the self-shielding, and thus, the burnable absorber is more slowly burnt.

In an aspect of the present invention, a burnable absorber is provided which has a shape appropriately charged so as to be spatially separated from the nuclear fuel. In the newly provided nuclear fuel rod including a burnable absorber, the ratio of the volume to the surface area may be determined by freely setting the design of the burnable absorber, and thus, there is a merit in that the self-shielding effect which is a physical characteristic may be optimized.

FIG. 1 illustrates a conceptual view of a general nuclear fuel rod 1, FIG. 2 illustrates a conceptual view of a nuclear fuel rod 10 according to an embodiment of the present invention, and FIG. 3 illustrates a conceptual view of a burnable absorber 13 according to an embodiment of the present invention.

Referring to the conceptual view of FIG. 2, the nuclear fuel rod 10 provided in an aspect of the present invention may have a shape in which fuel pellets 11 and burnable absorbers 13 are formed inside a cladding tube 12, and the burnable absorbers are inserted between the fuel pellets 11. The fuel pellets each may have a general pellet shape.

In a specific example, the burnable absorbers 13 each include a burnable absorber material 13a and cladding materials 13b surrounding the burnable absorber material 13a, and as illustrated in the conceptual view of FIG. 3, the burnable absorbers may favorably have a disk shape. The fact that the burnable absorbers have a disk shape may mean a burnable absorber formed by a disk-like burnable absorber material and cladding materials surrounding the disk-like burnable absorber material.

The nuclear fuel rod 10 provided in an aspect of the present invention includes the burnable absorber including cladding materials surrounding the burnable absorber material, and the burnable absorber is formed by the burnable absorber material and the cladding materials, and thus, the nuclear fuel rod provides direct use possibility also to burnable absorber materials, such as gadolinium (Gd) having the relatively low melting point to adjust the excess reactivity during an operation of a nuclear reactor. The burnable absorber material is sealed with cladding materials having relatively low melting points, so that an effect may be expected in that even when the burnable absorber material is melted in an abnormal environment of the nuclear reactor, loss of the burnable absorber material is prevented by causing the burnable absorber material to remain inside the cladding material. In addition, cladding materials having superior thermal conductivity are applied to the burnable absorbers stacked between the nuclear pellets, so that there is an effect of lowering the highest temperature of the fuel pellets formed during an operation of the nuclear reactor such that heat generated in the fuel pellets are more efficiently transferred to a coolant via the burnable absorber.

The burnable absorber material 13a may be gadolinium (Gd), $Gd_2O_3$, erbium (Er), $Er_2O_3$, boron carbide ($B_4C$), and the like. The nuclear fuel rod 10 provided in an aspect of the present invention includes the burnable absorbers 13, so that gadolinium (Gd) or erbium (Er), which are difficult to apply in related arts, may also be applied as it is.

Due to the design characteristics of not being in contact with the nuclear fuel, the burnable absorber materials serve as stable materials, and thus, there is no need to further add other materials in the application of the burnable absorber materials. Thus, materials such as Gd, $Gd_2O_3$, Er, $Er_2O_3$, and $B_4C$ may be a candidate group, and if necessary, specific isotopes of these burnable absorber materials may be enriched and used. Specifically, when applying $B_4C$, it is expected to be more economical while exhibiting the similar performance to that of IFBA from Westinghouse, and when $Er_2O_3$ is applied by enriching Er-167 or the like, more effective applicability is expected due to reactivity penalty compared to the case of applying $Er_2O_3$ with $Gd_2O_3$.

In addition, the cladding materials 13b may be an alloy including zirconium. In general, a raw material used for the raw materials of nuclear fuel rod cladding tubes may be used.

Furthermore, the nuclear fuel rod 10 may have at least one or more burnable absorbers 13 located between at least two or more nuclear pellets 11. In a specific example, the fuel rod may have a structure, in which a disk-like burnable absorber is stacked on a fuel pellet, another nuclear pellet is stocked on the burnable absorber, and another burnable absorber is stacked on the another fuel pellet, that is, the fuel rod may have a structure in which a plurality of fuel pellets and a plurality of burnable absorbers are alternately stacked.

The diameter of the burnable absorber 13 may be equal to the diameter of the fuel pellet 11. If the diameter of the burnable absorber is larger than the diameter of the fuel pellet, the burnable absorber cannot be charged into the cladding tube due to constraints of the cladding tube, and when the diameter of the burnable absorber is smaller than the diameter of the fuel pellet, the burnable absorber may move inside the cladding tube and thereby cause a mechanical problem.

The thickness of the burnable absorber 13 may be the thickness of a shape including the burnable absorber materials 13a and the cladding materials 13b surrounding the burnable absorber materials, may be approximately 0.1-2.0 mm, approximately 0.5-1.8 mm, approximately 1.0-1.7 mm, or approximately 1.3-1.6 mm. When the thickness of the burnable absorber exceeds approximately 2.0 mm, there may be a limitation in that the height of the entire reactor core is excessively high.

The thicknesses of the burnable absorber materials 13a and the cladding materials 13b of the burnable absorber 13 may be set on the basis of the thickness range of the burnable absorber. The self-shielding effect is adjusted by the ratio of the surface area and the volume, and the burnable absorber provided in an aspect of the present invention may optimize the self-shielding effect by flexibly adjusting the design of the burnable absorber material.

The diameters of the burnable absorber material 13a may be a diameter of approximately 30-95%, approximately 40-95%, approximately 50-90%, approximately 65-93%, approximately 70-92%, approximately 80-90%, approximately 50-85%, approximately 50-75%, or approximately 60-70% of the diameter of the fuel pellets 11.

In a specific example, as illustrated in FIG. 4, the radii of the burnable absorber material 13a may be represented by a in the burnable absorber 13, and a may be approximately 1-3 mm, approximately 1.5-2.5 mm, or 1.7-2.4 mm. In addition, the thicknesses of the absorber materials may be represented by b, and b may be 0.8-1.6 mm or 1.0-1.4 mm. In addition, the thickness of the burnable absorber may be represented by c, where c is greater than b, and c may be approximately greater than 0.8 mm and below 2.0 mm. In addition, the thickness d of the cladding materials may be approximately 0.05-0.2 mm, approximately 0.07-0.15 mm, or approximately 0.08-0.12 mm. In addition, a predetermined space may be formed between the burnable absorber and the nuclear pellets, the thickness of the predetermined space or gap may be represented by e, and e may be approximately 0.01-0.1 mm, or approximately 0.03-0.07 mm. In addition, the radii of the burnable absorber may be represented by f and be equal to the radii of the nuclear pellets, and f may be approximately 2-5 mm or approximately 3.5-4.5 mm.

In still another example, the fuel pellets 12 may have dishes formed in upper and lower portions thereof in the nuclear fuel rod 10. The dishes are formed in the upper and lower surfaces of the fuel pellets, so that the fuel pellets may be prevented from being pushed due to a phenomenon in which the pellets are irradiated with neutrons and axially expanded.

FIG. 6 illustrates a plan view of a nuclear fuel rod 10 according to another embodiment of the present invention, and specifically, the nuclear fuel rod 10 has a structure in which fuel pellets 11 and a disk-like burnable absorber 13 are alternately stacked, and the burnable absorber include a burnable absorber materials 13a and a cladding material 13b surrounding the burnable absorber material 13a, and the fuel pellets may have grooves 11a on the upper and lower portions thereof.

The nuclear fuel rod provided according to an aspect of the present invention has a merit in that the shape of the burnable absorber is freely adjusted and the self-shielding effect may be efficiently used. In addition, there is a merit in that due to the design in which the burnable absorber is positioned between the fuel pellets, the highest temperature of the burnable absorber is formed to be relatively lower than the fuel pellets, and the possibility that the burnable absorber is melted, and there is a merit in that the melted burnable absorber is positioned inside the cladding tube even under the assumption of being melted. Furthermore, there is a merit in that the manufacturing process of the burnable absorber constituted by a disk-type simple structure is also relatively very easy, and there is merit in that the integrity of already well-known nuclear fuel may be ensured because the burnable absorber has the shape of being separated from the nuclear fuel and independently present.

In addition, in another aspect of the present invention, there is provided a method for manufacturing a nuclear fuel rod, the method including: a step for preparing a burnable absorber including a burnable absorber material and a cladding material surrounding the burnable absorber material; and a step for alternately stacking in a cladding tube at least one or more fuel pellets and at least one or more burnable absorbers. The method for manufacturing a nuclear fuel rod to be provided in another aspect of the present invention provides an example of the method for manufacturing the above-mentioned nuclear fuel rod 10, and the components of the nuclear fuel rod 10 are the same as described above, and thus detailed description thereof will not be provided.

Furthermore, in still another aspect of the present invention, a nuclear reactor including the nuclear fuel rod is provided.

Hereinafter, the present invention will be described in detail through experimental examples.

However, the experimental examples below are merely for description of the present invention, and the content of the present invention are not limited by the experimental examples below.

Experimental Example 1

As illustrated in FIG. 4, as the nuclear fuel rod of example 1 (DiBA), a nuclear fuel rod was designed in which a unit body was formed such that a burnable absorber was positioned on upper and lower portions of the fuel pellets between the fuel pellets. Here, a was approximately 0.22527 cm, b was approximately 0.12048 cm, c was approximately 0.14048 cm, d was approximately 0.01 cm, e was 0.005 cm, and f was approximately 0.40958 cm. $Gd_2O_3$ was applied as burnable absorber materials.

In addition, CSBAs of related arts were designed as the nuclear fuel rod of comparative example 1 (3-ball CSBA) and the nuclear fuel rod of comparative example 2 (2-ball CSBA). Gadolinium was applied as burnable absorber materials.

Furthermore, a nuclear fuel was designed in which uranium oxides have approximately 7 wt % of enrichment as a control group (No BA (7 wt % $UO_2$)).

This experiment was performed by using a computation code Serpent 2, which is capable of very accurate computational simulation based on probabilistic method on the basis of ENDF/B-VII.1 nuclear data library. With respect to 17×17 nuclear FAs from Westinghouse Co., the behavior of reactivity according to burnup was evaluated under all reflective boundary condition by using approximately 100,000 histories. The evaluation was performed on the assumption that the temperature of the nuclear fuel is approximately 600 K, and uncertainty at this point was evaluated as approximately 30 pcm with respect to the multiplication factor.

FIG. 5 is a graph comparing the result of using gadolinium (Gd) as the burnable absorber in the design of FIG. 4 with the reactivity control performance of the existing gadolinia ($Gd_2O_3$) CSBA design. The size of the CSBA used in this case, that is, the radius of burnable absorber material, is optimized to be approximately 0.14 cm in case of two CSBAs (comparative example 2: 2-ball CSBA), and approximately 0.12 cm in case of three CSBAs (comparative example 1: 3-ball CSBA). After selecting the case (control group), in which a nuclear fuel with approximately 7% enrichment was used reflecting the requirement of a future-type long cycle period PWR and the SMR, for the problem of comparing the reactivity control performance, a single assembly was formed by fuel pellets to which the CSBA and DiBA were applied by using a Monte Carlo code, that is, a Serpent 2 code, and the reactivity evaluation was performed under all reflective boundary condition environment. When comparing with the result of existing CSBAs (comparative examples 1 and 2) in which spherical absorber materials capable of inherently maximizing the self-shielding effect to be determined by the ratio of surface area to volume, it was evaluated that the disk-type burnable absorber also had excellent performance in an aspect of reactivity control through optimization. Furthermore, gadolinium was applied to the nuclear fuel rod of the Example 1, so that the problem in related arts in which it was difficult to apply gadolinium could be solved. Meanwhile, even when applying $Gd_2O_3$ as a neutron absorber, a very similar result to the case of metallic Gd of FIG. 5 was obtained.

Specific reactivity control performance will be described below. When burnable absorbers rapidly react in an initial stage of a cycle period and are burnt, the initial reactivity will be evaluated to be low. Subsequently, although still in the initial stage of the cycle period, the reactivity will rapidly increase due to the rapidly burnt burnable absorbers, in a form converging to the reactivity in case of no burnable absorber. The increased reactivity thereafter exhibits a decreasing shape until the final stage of the cycle period, and this phenomenon is an inherent characteristic appearing in a strong burnable absorber such as Gd, and is referred as reactivity swing. All burnable absorbers are designed so as to appropriately show the reactivity swing through design optimization, and the target may be to maintain nearly flat reactivity during the entire cycle period.

In this aspect, when evaluating the reactivity swing in example 1 (DiBA) and comparative examples 1 and 2 (CSBA) shown in FIG. 5, it may be confirmed that while the burnable absorbers efficiently remain during the entire cycle period, flat reactivity is maintained such that the reactivity swing does not almost appear. Consequently, it can be said that when the same burnable absorbers are used, the CSBA and DiBA have almost similar reactivity control performance.

Experimental Example 2

As illustrated in FIG. 6, as the nuclear fuel rod of example 2 (DiBA), a nuclear fuel rod was designed in which a unit body was formed such that a burnable absorber was positioned on upper and lower portions of the fuel pellets between the fuel pellets. And the fuel pellet comprises dishes on upper and lower portions thereof. Here, a was approximately 0.12048 cm, b was approximately 0.22527 cm, c was approximately 0.14048 cm, d was approximately 0.01 cm, e was approximately 0.005 cm, and f was approximately 40,958 cm, the diameter of the groove was approximately 0.40100 cm, and the height of the groove was approximately 0.02500 cm. Gadolinium (Gd) was applied as burnable absorber materials.

In order to prevent a phenomenon in which the nuclear fuel was irradiated with neutrons and is unevenly expanded, small dishes were formed in upper and lower portions of initial fuel pellets in the manufacturing process. In aspect of reactivity control, since very small amount of nuclear fuel was removed, nearly the same performance as the existing result was exhibited. However, since the influence on the temperature distribution in burnable absorbers inside a nuclear fuel rod exerted by the fuel pellets having such dishes cannot be ignored, the heat transfer evaluation was performed considering the dishes.

With respect to the nuclear fuel rod of example 2 above, the heat transfer performance was analyzed by using a FEM-based COMSOL code, and the results thereof are illustrated in FIGS. 7 and 8.

FIG. 7 illustrates radial temperature distributions from central regions of a fuel pellet and a burnable absorber, and FIG. 8 illustrates axial and radial temperature distributions of a nuclear fuel rod including burnable absorbers.

As illustrated in FIGS. 7 and 8, it may be confirmed that even considering the heat transfer effect due to the dishes of the fuel pellets, a temperature gradient from the fuel pellets to the burnable absorbers is meaningfully formed. When compared with the case of no dishes, it was evaluated that the temperature at the highest point has a difference of approximately 50 K. As confirmable in FIGS. 7 and 8, in this evaluation, the highest temperature of the burnable absorbers is evaluated to be lower than the melting point of approximately 1,586 K of gadolinium (Gd) by approximately 600 K, so that there is no concern about the melting of the burnable absorbers in a normal environment. Even if, for some reasons, gadolinium (Gd) is melted, gadolinium (Gd) is melted while sealed together inside a cladding material, and there is a margin of approximately 500 K as long as a temperature is formed lower than the melting point of approximately 2,123 K of the cladding material. In addition, as may be found in the graph of FIG. 8, axial-direction heat transfer occurs via the burnable absorbers inside the fuel pellets. This shows that there is a merit in that the characteristics of a $UO_2$ nuclear fuel having relatively low thermal conductivity may be supplemented by the burnable absorbers.

The concept of burnable absorbers proposed in the present invention has a merit in that self-shielding effects may be efficiently used by freely adjusting the shapes of the burnable absorbers. In addition, there is a merit in that due to the design in which the burnable absorber is positioned between the fuel pellets, the highest temperature of the burnable absorber is formed to be relatively lower than the fuel pellets, and the possibility that the burnable absorber is melted is lowered, and there is a merit in that the melted burnable absorber is positioned inside the cladding material even under the assumption of being melted. Furthermore, there is a merit in that the manufacturing process of the burnable absorber constituted by a disk-type simple structure is also very easy, and there is merit in that the integrity of already well-known nuclear fuel may be ensured because the burnable absorber has the shape of being separated from the nuclear fuel and independently present.

After positioning a nuclear fuel rod including burnable absorbers in a nuclear FA used in an actual commercial reactor core and performing a numerical analysis, it was confirmed that due to a self-shielding effect, an effect was exhibited which was comparable to or better than the performance of the existing CSBA which was very efficiently applied. In addition, after evaluating the performance of the nuclear fuel rod including burnable absorbers in an aspect of heat transfer, it was confirmed that the highest temperature of the burnable absorbers was relatively lowered remarkably due to the burnable absorbers present between the fuel pellets. This means that various materials may be considered as a burnable absorber for a nuclear fuel rod. Since the actual positions of the burnable absorbers are independent from those of the fuel pellets, there is a merit of having no problem in manufacturability and compatibility. Also in aspect of manufacturing equipment, it is determined to be economical to additionally position independent burnable absorbers by optimizing the heights of the fuel pellets, so that high applicability and feasibility are expected not only in actual PWRs but also in boiling water reactors. In particular, in case of a PWR, it is expected that water-soluble boron which causes various problems in large-scale commercial reactor is removed, and that the economic feasibility and safety are remarkably improved. In addition, it is expected that even in the SMR, spotlighted as a next-generation nuclear reactor, the reactor core design, operability, safety, and economic feasibility are drastically improved and the realization of a high-performance SMR will be made possible.

A nuclear fuel rod provided in an aspect of the present invention introduces burnable absorbers having shapes appropriately charged to be separate from nuclear fuels, and the ratio of the surface area thereof to the volume thereof may be determined by freely setting the design of the burnable absorbers, and accordingly, the self-shielding effect which is a physical property may be optimized. In addition, burnable absorber materials and cladding materials are formed as the burnable absorbers, so that the possibility is provided in which the positions of the neutron absorbers are fixed, and even for metallic burnable absorber materials such as gadolinium (Gd) having relatively low meting point, the burnable absorbers can be directly used to adjust the excess reactivity during the operation of a nuclear reactor. The burnable absorber material is sealed with cladding materials having the relatively high melting point, so that an effect may be expected in that even when the burnable absorber material is melted in an abnormal environment of the nuclear reactor, loss of the burnable absorber material is prevented by causing the burnable absorber material to remain inside the cladding material. In addition, the cladding material having a superior thermal conductivity is applied to the burnable absorbers stacked between the nuclear pellets, so that there is an effect of lowering the highest temperature of the fuel pellets formed during the operation of the nuclear reactor such that heat generated in the fuel pellets are more efficiently transferred to a coolant via the burnable absorber.

So far, the nuclear fuel rod including burnable absorbers provided in an aspect of the present invention has been described, but the present invention is not construed to be limited by the examples and drawings disclosed in the specification, and various modifications can be made, of course, by those skilled in the art within the technical concept of the present invention.

What is claimed is:

1. A nuclear fuel rod comprising at least two fuel pellets, a cladding tube surrounding the fuel pellets, and at least two burnable absorbers inside the cladding tube, wherein each of the burnable absorbers consists of a burnable absorber material located in a cladding material which surrounds a perimeter edge, a top surface, and a bottom surface of the burnable absorber material,
each of the burnable absorbers has a disk shape,
the burnable absorber material of at least two burnable absorbers have a different surface area and/or volume,
the cladding material is a zirconium-based alloy, each cladding material has a substantially same surface area and/or volume, and
each of the burnable absorbers is located on a respective one of the fuel pellets such that the burnable absorbers and the fuel pellets are stacked along a longitudinal direction of the nuclear fuel rod,
and wherein a self-shielding effect is optimized by the different surface area and/or the volume of the burnable absorber material of the at least two burnable absorbers.

2. The nuclear fuel rod of claim 1, wherein in the nuclear fuel rod, each of the at least two burnable absorbers is located between at least two or more fuel pellets.

3. The nuclear fuel rod of claim 1, wherein the burnable absorber material comprises one or more selected from the group consisting of Gadolinium (Gd), gadolinia ($Gd_2O_3$), erbium (Er), $Er_2O_3$, and boron carbide ($B_4C$).

4. The nuclear fuel rod of claim 1, wherein the diameter of each of the at least two burnable absorbers is equal to the diameter of the at least two fuel pellets.

5. The nuclear fuel rod of claim 1, wherein the thickness of each of the at least two burnable absorbers is approximately 0.1 mm-2.0 mm.

6. The nuclear fuel rod of claim 1, wherein in each of the at least two burnable absorbers, the diameter of the burnable absorber material is approximately 30-95% of the diameter of the at least two fuel pellets.

7. A nuclear reactor comprising the nuclear fuel rod of claim 1.

8. A method for manufacturing a nuclear fuel rod, the method comprising:
preparing disk-shaped burnable absorbers, each consisting of a burnable absorber material located in a cladding material which surrounds a perimeter edge, a top surface, and a bottom surface of the burnable absorber material,
the burnable absorber material of at least two burnable absorbers have a different surface area and/or volume,
the cladding material being a zirconium-based alloy, each cladding material has a substantially same surface area and/or volume; and
stacking, in a cladding tube along a longitudinal direction of the nuclear fuel rod, at least two fuel pellets and said at least two burnable absorbers, so that each of the burnable absorbers is located on a respective one of the fuel pellets;
and wherein a self-shielding effect is optimized by the different surface area and/or the volume of the burnable absorber material of the at least two burnable absorbers.

* * * * *